Figure 1:
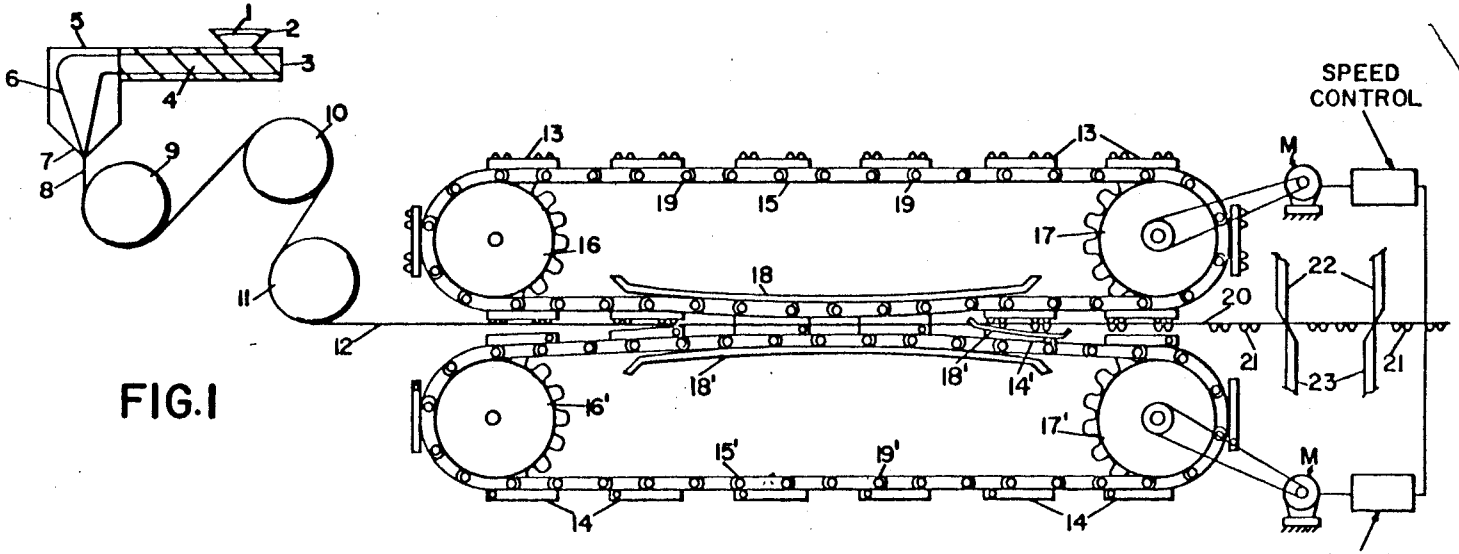
Figure 2:
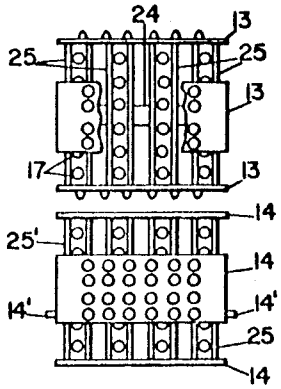
Figure 3:
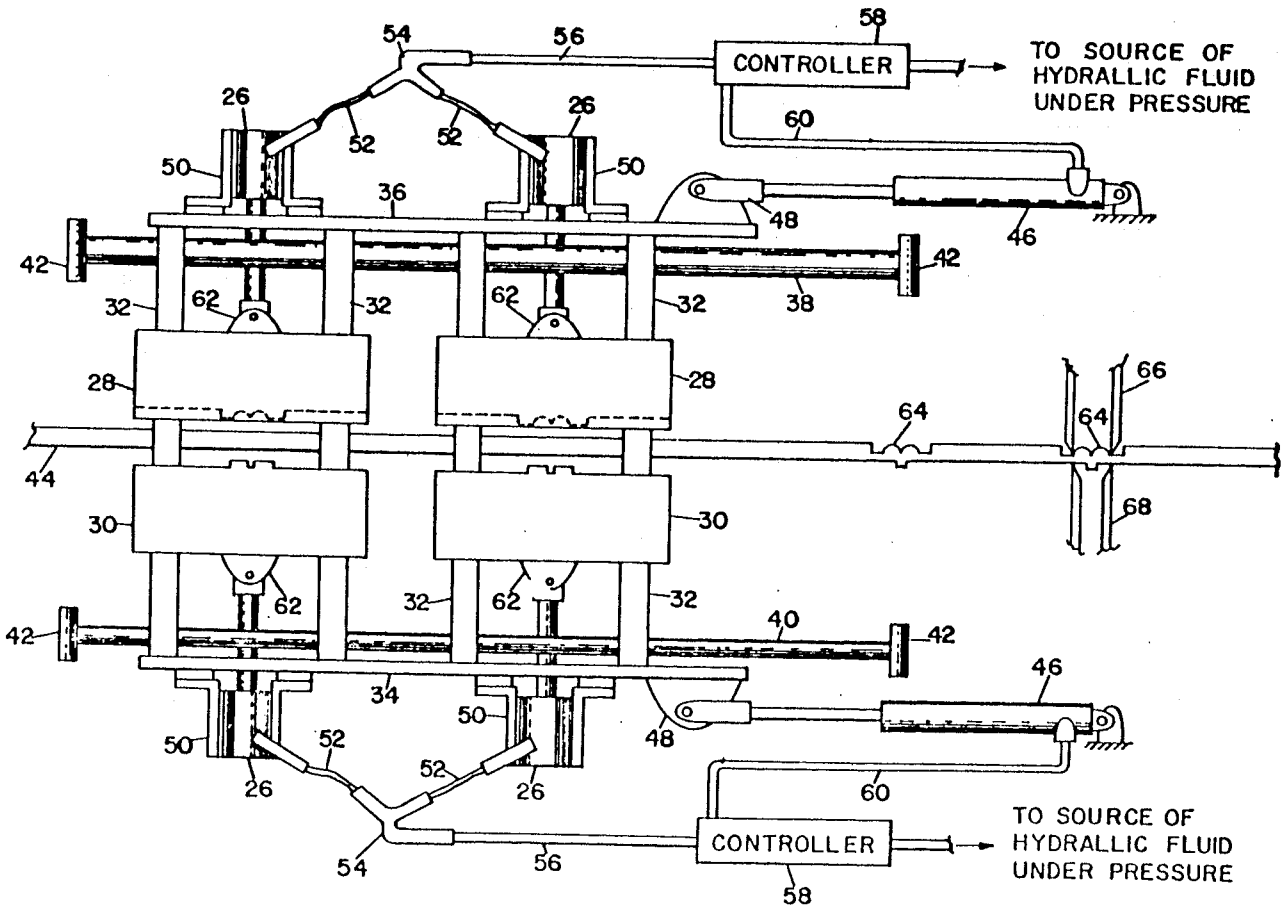

BEST AVAILABLE COPY

DEFENSIVE PUBLICATION T856,042

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED NOVEMBER 26, 1968

856 O.G. 1020

617,897

METHOD AND APPARATUS FOR FORMING SHAPED ARTICLES FROM A CONTINUOUSLY MOVING BODY OF THERMOPLASTIC MATERIAL

Charles J. Villier and Charles G. Chandler, both % Tennessee Eastman Company, P.O. Box 511, Kingsport, Tenn. 37662

Filed Feb. 23, 1967. Published Nov. 26, 1968

Class 264—151

2 Sheets Drawings. 13 Pages Specification

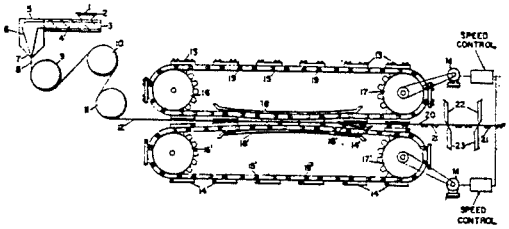

A method for forming shaped articles by passing a heat-softened body of thermoplastic material, either drawn or undrawn between matching die or mold halves which are moving in the direction and at the speed of the thermoplastic body, forcing the mold or die halves into forming relationship, cooling the formed article, separating the matched die halves, and removing the formed article. The apparatus used to accomplish the method includes die mountings which cause or permit the die halves to move vertically into forming relationship and horizontally at the speed of the heat-softened body of thermoplastic material. The die halves are brought together either by hydraulic pressure applying means or by guides located along their path of movement.

| U.S. Pat. Off. | |
|---|---|
| CLASS 264 | SUBCLASS 151 |
| APPROVED BY DRAFTSMAN | |

Sheet 2 of 9.

Charles J. Villier
Charles G. Chandler
INVENTORS

BY William J. French
Charles H. Hill

BEST AVAILABLE COPY

617897

T856042

8-1

BEST AVAILABLE COPY

T856042

2-2

617897

U.S. Pat. Off.
CLASS | SUBCLASS
APPROVED BY DRAFTSMAN

Charles J. Villier
Charles G. Chandler
INVENTORS

BY William T. French
George P. Chandler
ATTORNEYS